(12) United States Patent
Ozeki et al.

(10) Patent No.: US 9,051,633 B2
(45) Date of Patent: Jun. 9, 2015

(54) ALUMINUM ALLOY WELDED MEMBER

(75) Inventors: Yoshikazu Ozeki, Aichi (JP); Toshihiko Fukuda, Aichi (JP); Kenji Katou, Gifu (JP)

(73) Assignee: SUMITOMO LIGHT METAL INDUSTRIES, LTD., Tokyo (JP)

( * ) Notice: Subject to any disclaimer, the term of this patent is extended or adjusted under 35 U.S.C. 154(b) by 297 days.

(21) Appl. No.: 13/640,120

(22) PCT Filed: Oct. 8, 2010

(86) PCT No.: PCT/JP2010/068226
§ 371 (c)(1),
(2), (4) Date: Oct. 9, 2012

(87) PCT Pub. No.: WO2012/046352
PCT Pub. Date: Apr. 12, 2012

(65) Prior Publication Data
US 2013/0029114 A1    Jan. 31, 2013

(51) Int. Cl.
*B32B 15/04*    (2006.01)
*C22C 21/06*    (2006.01)
(Continued)

(52) U.S. Cl.
CPC ............... *C22C 21/06* (2013.01); *B23K 20/122* (2013.01); *B23K 20/2336* (2013.01); *C22C 21/00* (2013.01); *B23K 2203/10* (2013.01); *C25D 11/04* (2013.01)

(58) Field of Classification Search
CPC ... C22C 21/16; B23K 20/2336; B23K 20/122
USPC .......................... 428/195.1; 420/528, 542, 546
See application file for complete search history.

(56) References Cited

U.S. PATENT DOCUMENTS 6,516,992 B1   2/2003   Colligan
7,993,575 B2   8/2011   Nelson et al.
(Continued)

FOREIGN PATENT DOCUMENTS

CN   1638910 A      7/2005
CN   101064243 A   10/2007
(Continued)

OTHER PUBLICATIONS

Final Office Action mailed Jul. 31, 2013 in related U.S. Appl. No. 13/552,394.
(Continued)

*Primary Examiner* — Mark Ruthkosky
*Assistant Examiner* — Christopher Polley
(74) *Attorney, Agent, or Firm* — J-Tek Law PLLC; Jeffrey D. Tekanic; Scott T. Wakeman

(57) ABSTRACT

An aluminum alloy material is welded by performing friction stir welding to form a welded section in an aluminum alloy welded component. The aluminum alloy material contains Mg: 0.3-6.0% (mass %, hereinafter the same), Cu: 0.2% or less, Si: 0.1% or less, Fe: 0.1% or less, the balance being Al and inevitable impurities. Second phase particles dispersed in the aluminum alloy material have a grain size of 5 μm or less as observed with an optical microscopic. Because the second phase particles are homogeneously dispersed in a welded section equivalent portion of the aluminum alloy welded component as compared to other portions, variations in pit formation caused by etching during anodizing are reduced, thereby eliminating color tone variations in the anodized coating formed on the aluminum alloy welded component.

20 Claims, 3 Drawing Sheets

(51) Int. Cl.
  *B23K 20/12* (2006.01)
  *B23K 20/233* (2006.01)
  *C22C 21/00* (2006.01)
  *C25D 11/04* (2006.01)

(56) References Cited

U.S. PATENT DOCUMENTS

| | | | |
|---|---|---|---|
| 8,302,834 | B2 | 11/2012 | Nelson et al. |
| 2001/0050118 | A1* | 12/2001 | Raynaud et al. ............. 148/439 |
| 2002/0006352 | A1* | 1/2002 | Spanjers et al. ............. 420/544 |
| 2003/0145912 | A1* | 8/2003 | Haszler et al. ............... 148/417 |
| 2003/0160085 | A1 | 8/2003 | Thach et al. |
| 2003/0205479 | A1 | 11/2003 | Lin et al. |
| 2004/0041004 | A1 | 3/2004 | Thach et al. |
| 2004/0041005 | A1 | 3/2004 | Tanaka et al. |
| 2004/0084506 | A1 | 5/2004 | Tanaka et al. |
| 2005/0037188 | A1* | 2/2005 | Ehrstrom et al. .......... 428/299.4 |
| 2006/0278325 | A1 | 12/2006 | Kumagai |
| 2007/0102071 | A1* | 5/2007 | Druschitz .................... 148/552 |
| 2007/0102822 | A1 | 5/2007 | Kubota et al. |
| 2007/0138235 | A1 | 6/2007 | Kumagai et al. |
| 2007/0138239 | A1 | 6/2007 | Kumagai et al. |
| 2008/0274383 | A1 | 11/2008 | Kanno et al. |
| 2009/0250144 | A1 | 10/2009 | Kumagai et al. |
| 2010/0051147 | A1 | 3/2010 | Sano et al. |
| 2010/0170996 | A1* | 7/2010 | Sankaran et al. ............ 244/133 |
| 2011/0236718 | A1 | 9/2011 | Fukuda et al. |
| 2014/0023874 | A1 | 1/2014 | Fukuda et al. |

FOREIGN PATENT DOCUMENTS

| | | |
|---|---|---|
| JP | H02-8342 A | 1/1990 |
| JP | H11-21648 A | 1/1999 |
| JP | 11-285862 | 10/1999 |
| JP | 2000-248399 | 9/2000 |
| JP | 2001-269780 | 10/2001 |
| JP | 2003-225780 | 8/2003 |
| JP | 2003-230970 | 8/2003 |
| JP | 2004-176154 A | 6/2004 |
| JP | 2005-000967 | 1/2005 |
| JP | 2006-043730 | 2/2006 |
| JP | 2007-061877 | 3/2007 |
| JP | 2007-064129 | 3/2007 |
| JP | 2007-275396 | 10/2007 |
| JP | 2011-25275 | 2/2011 |
| WO | 03073478 A2 | 9/2003 |

OTHER PUBLICATIONS

English translation of International Preliminary Report on Patentability from parent PCT application No. PCT/JP2010/068226.
International Search Report from parent PCT application No. PCT/JP2010/068226.
U.S. Appl. No. 13/552,394, filed Jul. 18, 2012.
Office Action from Chinese Patent Office mailed Jan. 6, 2015 in counterpart Chinese Application No. 201080065641.5.
Extended European Search Report from the European Patent Office in counterpart European patent application No. 10858158.8 mailed on Mar. 9, 2015, including European Search Opinion, European Search Report and examined claims 1-9.

* cited by examiner

ALUMINUM ALLOY WELDED MEMBER

CROSS-REFERENCE

This application is the US national stage of International Patent Application No. PCT/JP2010/068226 filed on Oct. 8, 2010.

TECHNICAL FIELD

The present invention relates to an aluminum alloy welded component which may be used, e.g., in the manufacture of vehicular wheels and housings, and which has an anodized coating formed after end portions of one or more aluminum alloy members have been integrally welded by friction stir welding.

BACKGROUND ART

In the past, aluminum alloy welded components have been used in the manufacture of vehicular wheels and housings due to their light weight properties. For example, in the manufacture of vehicular wheels as shown in FIGS. 1 and 2, a plate-shaped aluminum alloy member 11 is bent into a cylindrical shape, and then end portions 12 thereof are butted against each other and integrally welded by friction stir welding 13 therebetween, to make a cylindrical component 14. In addition, both ends are flared to make the wheel. Furthermore, to improve the corrosion resistance and the wear resistance on the design surface, a coating is formed by anodizing the design surface, which is the surface on the opposite side of the welded section.

In addition, in the case of housings 1 as shown in FIG. 3, a side member 3 and a cover member 2, which are both made from an aluminum alloy material, are integrally welded by friction stir welding to form a joint 5. The integrally-welded side member 3 and the cover member 2 are face milled to smoothen the outer surface of the welded side, including the welded section 4, and then a coating 6 is formed on the design surface by anodizing to improve corrosion and wear resistance properties.

However, color tone variations may occur in the coating 6 formed on the design surface due to differences of the crystal grain sizes between the portions corresponding to the welded section 4 and other non-welded portions.

Therefore, to eliminate color tone variations due to differences of crystal grain sizes between the portion corresponding to the welded section in the coating of the aluminum alloy welded component and other portions, it has been proposed to equalize the crystal grain sizes by performing a heat treatment prior to the anodizing treatment.

However, even if the crystal grain sizes are equalized by performing a heat treatment prior to anodizing, the color tone variations, which exist between the portion corresponding to the welded section in the coating of the aluminum alloy welded component and the other portions, may not be sufficiently reduced.

PRIOR ART DOCUMENTS

Patent Reference 1: Japanese Patent Application Publication No. 2003-225780
Patent Reference 2: Japanese Patent Application Publication No. 2003-230970

SUMMARY OF THE INVENTION

Therefore, the cross-sectional microstructures of the welded section obtained by friction stir welding and the other non-welded portions of the aluminum alloy welded component were first compared in detail using an optical microscope. As a result, it was found that second phase particles of 2 μm or larger in the welded section were decreased because the second phase particles made of coarse Al—Fe—Si particles were finely pulverized by the stirring; second phase particles of 5 μm or larger were scarcely found. Then, a comparison investigation was performed on the portion in the design surface that forms the coating, which is equivalent to the welded section (hereinafter, called "welded section equivalent portion"), and the other non-welded portions. As a result, it was found that the second phase particles, including the coarse second phase particles, were inhomogeneously dispersed in the welded section equivalent portion. In other words, due to the second phase particles being inhomogeneously dispersed in the welded section equivalent portion in this manner, color tone variations could be recognized in the coating, because variations in pit formation caused by etching during the anodizing treatment become larger.

Consequently, to eliminate color tone variations in the coating of the aluminum alloy welded component, it is necessary to promote a homogeneous dispersion of the second phase particles within the aluminum alloy welded component.

Therefore, color tone variations in the anodized coating of the aluminum alloy welded component attributable to the inhomogeneous dispersion of second phase particles at the welded section equivalent portion are preferably eliminated in the manner that will be further described below.

According to a first aspect of the present teachings, an aluminum alloy welded component is formed from one or more aluminum alloy members comprised of Mg: 0.3% to 6.0% (mass %, hereinafter the same), Cu: 0.2% or less, Si: 0.1% or less, Fe: 0.1% or less, the balance being Al and inevitable impurities. The grain size of second phase particles dispersed within the aluminum alloy member(s) is 5 μm or less when observed with an optical microscope. In addition, mutually-facing end surfaces of the aluminum alloy member(s) are integrally welded by friction stir welding so as to form a welded section, and a coating is formed by anodizing a surface of the welded section, or an opposite surface thereof. Because the amounts of Si and Fe that could form second phase particles, and the average diameter of the second phase particles, within the aluminum alloy member(s) fall within prescribed ranges, the inhomogeneous dispersion of the second phase particles is suppressed, even if the aluminum alloy member(s) is (are) welded in the welded section equivalent portion by friction stir welding and even as compared to the other portions. As a result, because variations in pit formation caused by etching during anodizing between the welded section equivalent portion and the other portions decrease, it is possible to prevent color tone variations in the coating of the aluminum alloy welded component.

In the context of the present teachings, Mg contained in the aluminum alloy welded component contributes to adjusting the strength of vehicular wheels and housings, which are shown in FIGS. 1-3. Therefore, because the strength is insufficient with less than 0.3% Mg and shaping becomes difficult with more than 6.0% Mg, while Mg should preferably be 0.3% to 6.0%, for a good balance of ensuring strength and ease of shaping, it is more preferably 1.0% to 6.0%, and even more preferably 2.0% to 6.0%.

In addition, Cu contributes to homogenizing the color tone of the entire coating after anodizing. Therefore, because the coating after anodizing will be turbid with more than 0.2% Cu due to the effect of fine precipitates of Al—Cu particles, 0.2% or less Cu is included according to the present invention.

Further, Si and Fe form second phase particles made of Al—Fe—Si. If the amounts of Si and Fe are each more than 0.1%, coarse second phase particles of Al—Fe—Si that exceed a grain size of 5 μm can easily form. Therefore, although the coarse second phase particles are preferably pulverized in the welded section during friction stir welding, the second phase particles, including the coarse particles, are inhomogeneously dispersed in the welded section equivalent portion by the agitation of the friction stir welding. As a result, variations in pit formation caused by the etching during anodizing increase due to the second phase particles being inhomogeneously dispersed in the welded section equivalent portion as compared to other portions, and color tone variations in the coating are caused. Therefore, according to the present teachings, the amounts of Si and Fe are each preferably 0.1% or less and more preferably 0.07% or less.

According to a second aspect of the present teachings, which is based on the above-described first aspect, the second phase particles within the aluminum alloy member(s) are dispersed in the aluminum alloy welded component in an amount of 10000 particles/mm$^2$ or less when observed using an optical microscopic. If the second phase particles dispersed within the aluminum alloy members are thus reduced, the dispersion of the second phase particles in the welded section equivalent portion caused by the agitation during the friction stir welding can be minimized as compared to the other portions. As a result, variations in pit formation caused by the etching during anodizing become less, and the color tone variation in the coating can be eliminated more reliably.

As described so far, the inhomogeneous dispersion of the second phase particles is a cause of the color tone variation in the coating formed by anodizing the above-described aluminum alloy welded component. Therefore, if the distribution density of the second phase particles when observed using an optical microscope is greater than 10000 particles/mm$^2$, the dispersion of the second phase particles in the welded section equivalent portion during friction stir welding becomes more inhomogeneous as compared to the other portions. Therefore, variations in pit formation caused by the etching during anodizing increasingly cause color tone variations in the coating. Thus, according to this aspect of the present teachings, the quantity of second phase particles is reduced to prevent their inhomogeneous dispersion in the welded section equivalent portion, and the distribution density of the second phase particles when observed using an optical microscope is set to 10000 particles/mm$^2$ or less.

According to the aluminum alloy welded component of the present teachings, even though an anodized coating is formed on the side of the welded section surface or the surface opposite thereof, a higher quality anodized product can be achieved by limiting the amounts of metal(s) that may form second phase particles and by limiting the grain size of the second phase particles in both the welded section equivalent portion and the other portions. A uniform coating is thus formed that reliably eliminates color tone variations caused by the inhomogeneous dispersion of the second phase particles. Further, by appropriately setting the distribution density of the second phase particles, the elimination of color tone variations preferably can be achieved more reliably.

DETAILED DESCRIPTION OF THE INVENTION

Figure 1:
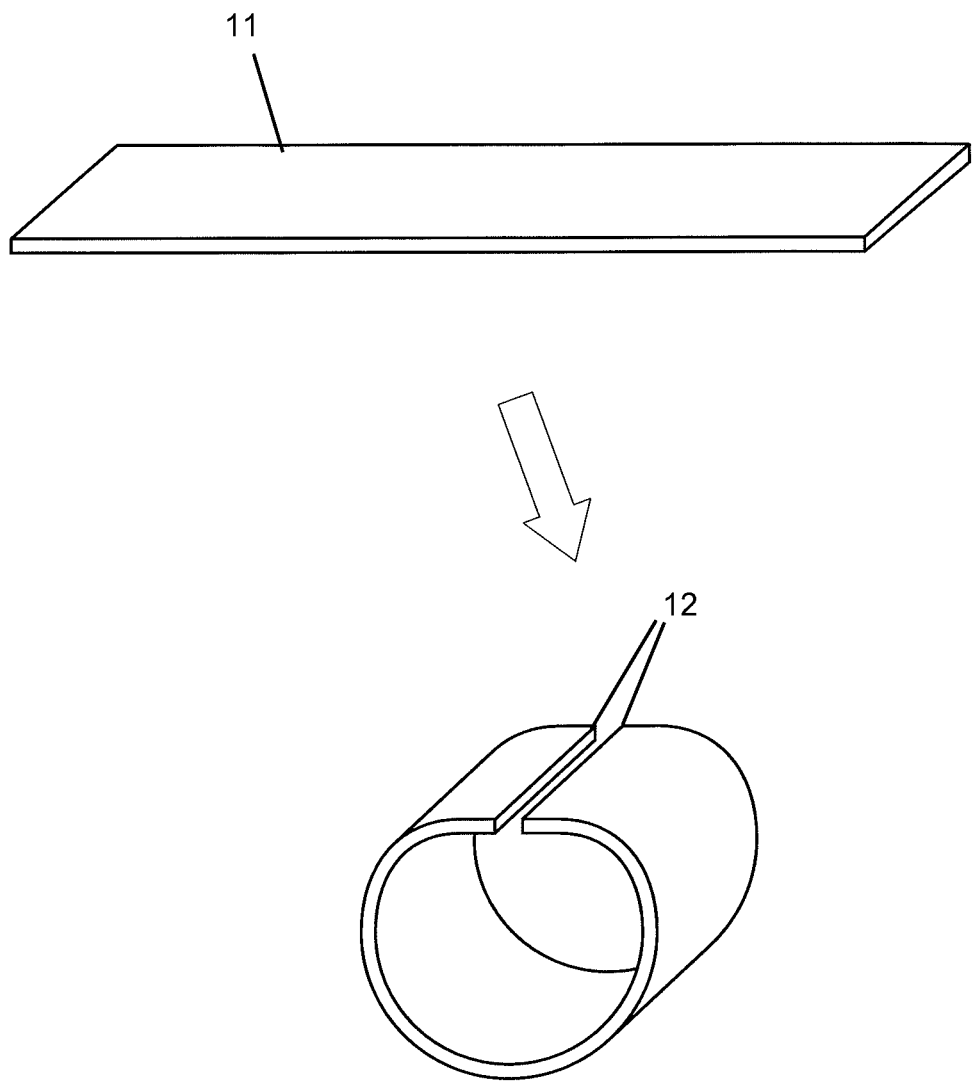
FIGS. 1 and 2 show a process for making a vehicle wheel.
Figure 2:
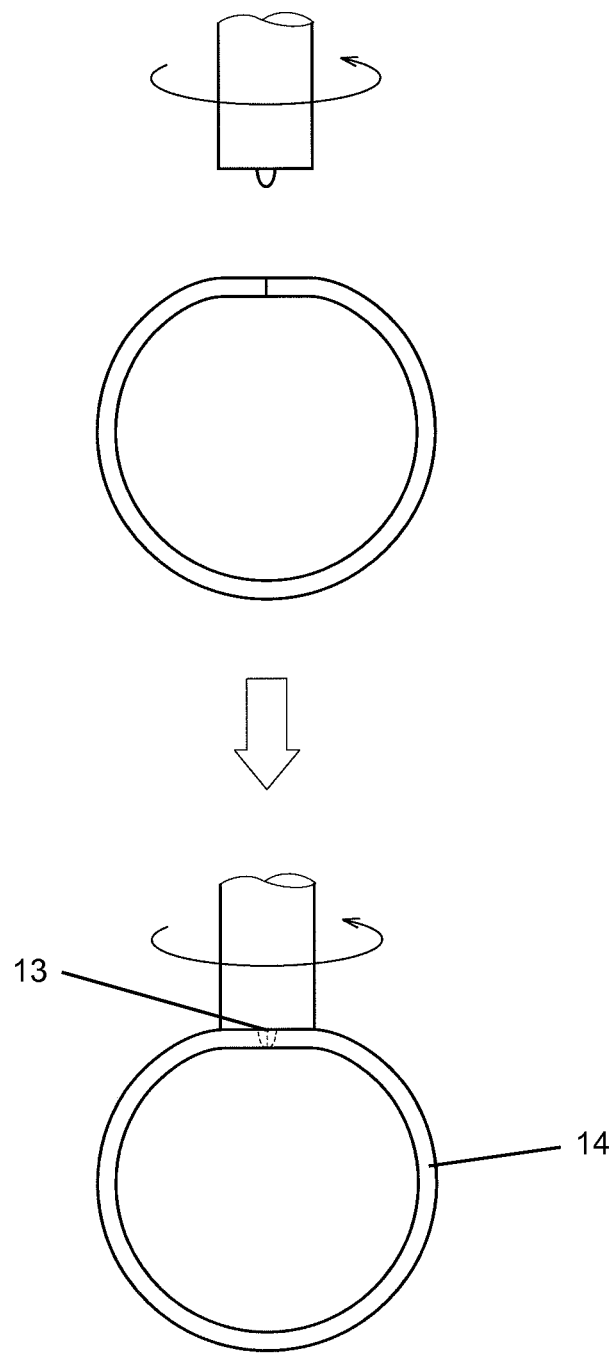
Figure 3:
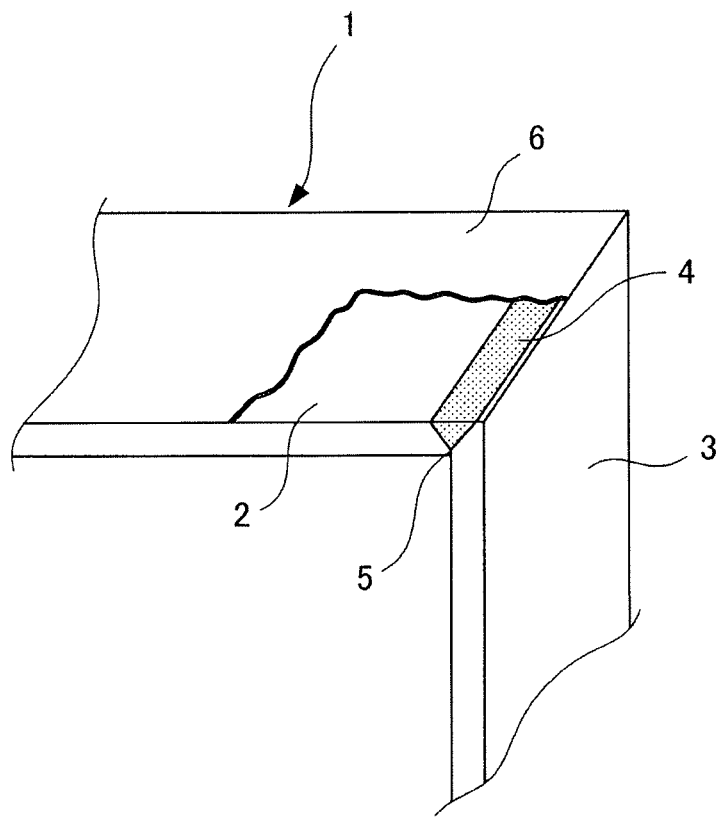
FIG. 3 shows a housing having an anodized coating.

The objective, i.e. to eliminate color tone variations existing between the welded section equivalent portion and the other portions in the coating of the aluminum alloy welded component welded by friction stir welding, is realized by limiting the amounts of Si and Fe that form second phase particles, and by limiting the grain sizes of the second phase particles. Further, by preferably also limiting the distribution density of the second phase particles, the objective can be realized in a more reliable manner.

EXAMPLES

Therefore, the effects of the present teachings were confirmed by the following experimental results.

First, with respect to the aluminum alloy members, all of which contain Si and Fe that form second phase particles, two different 5000-series aluminum alloys were used as inventive materials 1, 2, and 3, in which the amounts of Si or Fe were at almost upper thresholds thereof. Two different 5052 materials, in which the amounts of Si or Fe slightly exceeded the upper thresholds, which will be called 5052 Material 1 and 5052 Material 2, were used as comparative examples.

The chemical compositions of the inventive materials 1, 2 and 3 and the 5052 Materials 1 and 2 are shown below in Table 1.

The inventive examples and the comparative examples were obtained by producing an ingot according to a semi-continuous casting process, homogenizing, forming plates having a thickness of 2.5 mm by hot rolling and cold rolling and then annealing to the O-temper (full-softening material). Two plates each having a size of 100 mm in width×200 mm in length were prepared. Longitudinal end surfaces thereof were butted with each other and friction stir welded. The tool revolutions per minute were 500 rpm, the welding speed was 800 mm/min., the tool shoulder diameter was 7 mm, and the probe diameter was 3 mm.

TABLE 1

| Material | Si | Fe | Cu | Mn | Mg | Cr | Zn | Ti | Al (mass %) |
|---|---|---|---|---|---|---|---|---|---|
| Material 1 | 0.08 | 0.07 | 0.12 | 0.00 | 5.89 | 0.01 | 0.00 | 0.00 | Bal. |
| Material 2 | 0.09 | 0.02 | 0.16 | 0.00 | 3.87 | 0.01 | 0.00 | 0.00 | Bal. |
| Material 3 | 0.03 | 0.10 | 0.07 | 0.00 | 3.17 | 0.01 | 0.00 | 0.00 | Bal. |
| 5052 Material 1 | 0.12 | 0.07 | 0.02 | 0.02 | 2.44 | 0.21 | 0.01 | 0.02 | Bal. |
| 5052 Material 2 | 0.04 | 0.13 | 0.05 | 0.03 | 2.61 | 0.19 | 0.02 | 0.01 | Bal. |

Then, the longitudinal end surfaces of the aluminum alloy members of the inventive materials 1, 2, and 3 serving as examples of the present invention, as well as the 5052 Materials 1 and 2 serving as the comparative examples, were integrally welded by friction stir welding along abutted portions to form a welded section; after welding, 0.5 mm of the surface layer of the welded surface, including the welded section, was removed using a milling machine, then a rough surface finish was prepared by shot blasting and an anodized coating having a thickness of 10 μm was formed by anodizing with sulfuric acid.

As a result, the effect of the invention was confirmed as no color tone variation between the welded section equivalent portion and the other portions was observed in the coatings formed on the aluminum alloy welded components of the materials 1, 2, and 3 according to the examples of the present invention. On the other hand, color tone variations between the welded section equivalent portion and the other portions were apparent in the coatings formed on the aluminum alloy welded components of the 5052 Materials 1 and 2 according to the comparative examples.

Furthermore, surface microstructures were observed after removal of 0.5 mm by face milling in the welded section equivalent portion and the other portions of the inventive materials 1, 2, and 3 according to the examples of the invention and the 5052 Materials 1 and 2 of the comparative examples. After buffing and then etching with 5% hydrogen fluoride, the microstructures were magnified 400 times using an optical microscope, and the number of particles per 1 mm$^2$ was obtained by measuring using an image analysis at 1 μm dot pitch grain size.

As a result, in the exemplary aluminum alloy welded components of the present invention, it was observed that the second phase particles were homogeneously dispersed in the welded section equivalent portion on the opposite surface as compared to the other portions. Furthermore, in inventive material 1, the largest particle diameter was 5 μm, and the distribution density of the second phase particles equal to 5 μm or smaller was 7350 particles/mm$^2$; in inventive material 2, the largest particle diameter was 4 μm, and the distribution density of the second phase particles equal to 4 μm or smaller was 2310 particles/mm$^2$; in inventive material 3, the largest particle diameter was 5 μm, and the distribution density of the second phase particles equal to 5 μm or smaller was 4150 particles/mm$^2$. On the other hand, in the aluminum alloy welded components for the 5052 Materials according to the comparative examples, the second phase particles were inhomogeneously dispersed in the welded section equivalent portion as compared to the other portions. In addition, in 5052 Material 1, the largest particle diameter was 6 μm, and the distribution density of the second phase particles equal to 6 μm or smaller was 6170 particles/mm$^2$; in 5052 Material 2, the largest particle diameter was 7 μm, and the distribution density of the second phase particles equal to 7 μm or smaller was 8620 particles/mm$^2$.

In addition, the effect of appropriately setting the distribution density was confirmed by the following experiment.

Inventive material 4 was used as the inventive material and 5052 Material 3 containing a greater amount of Fe was used as the 5052 Material (comparative example). The chemical compositions are shown below in Table 2. The materials for testing were produced and evaluated by the same production and evaluation methods as mentioned above.

As a result, inventive material 4 exhibited neither color tone variations nor streak patterns in the welded section equivalent portion after the anodizing, the largest particle diameter was 4 μm, and the distribution density of the second phase particles equal to 4 μm or smaller was 2390 particles/mm$^2$. On the other hand, the 5052 Material 3 exhibited color tone variations in the welded section equivalent portion after anodizing, the second phase particles were inhomogeneously dispersed in the welded section equivalent portion thereof as compared to the other portions, the largest particle diameter was 8 μm, and the distribution density of the second phase particles equal to 8 μm or smaller was 11670 particles/mm$^2$.

TABLE 2

| Material | Si | Fe | Cu | Mn | Mg | Cr | Zn | Ti | Al (mass %) |
|---|---|---|---|---|---|---|---|---|---|
| Material 4 | 0.04 | 0.07 | 0.08 | 0.00 | 3.25 | 0.01 | 0.00 | 0.00 | Bal. |
| 5052 Material 3 | 0.09 | 0.28 | 0.03 | 0.01 | 2.52 | 0.18 | 0.01 | 0.01 | Bal. |

The invention claimed is:

1. An aluminum alloy welded component including:
   one or more aluminum alloy members comprised of Mg: 0.3 mass % to 6.0 mass %, Cu: 0.2 mass % or less, Si: 0.1 mass % or less, Fe: 0.1 mass % or less, the balance being Al and inevitable impurities, wherein:
   all second phase particles dispersed within the aluminum alloy member(s) have a grain size of 5 μm or less as observed with an optical microscope;
   mutually-facing end surfaces of the aluminum alloy member(s) are integrally welded together along a friction stir weld that defines a welded section; and
   an anodized coating is disposed on an outer surface of the welded section, or on an opposite surface thereof.

2. The aluminum alloy welded component according to claim 1, wherein the second phase particles are dispersed in the aluminum alloy members in an amount of 10000 particles/mm$^2$ or less as observed with an optical microscope.

3. The aluminum alloy welded component according to claim 2, wherein the aluminum alloy member(s) contain(s) 1.0-6.0 mass % Mg.

4. The aluminum alloy welded component according to claim 3, wherein the aluminum alloy member(s) contain(s) 2.0-6.0 mass % Mg.

5. The aluminum alloy welded component according to claim 4, wherein the aluminum alloy member(s) contain(s) 0.07 mass % or less Si and 0.07 mass % or less Fe.

6. The aluminum alloy welded component according to claim 5, wherein the aluminum alloy welded component is a vehicular wheel comprising a single cylindrical-shaped aluminum alloy member having a friction stir weld along its mutually-facing end surfaces.

7. The aluminum alloy welded component according to claim 5, wherein the aluminum alloy welded component is a housing comprising two aluminum alloy members having a friction stir weld along their mutually-facing end surfaces.

8. The aluminum alloy welded component according to claim 1, wherein the aluminum alloy member(s) contain(s) 1.0-6.0 mass % Mg.

9. The aluminum alloy welded component according to claim 8, wherein the aluminum alloy member(s) contain(s) 2.0-6.0 mass % Mg.

10. The aluminum alloy welded component according to claim 1, wherein the aluminum alloy member(s) contain(s) 0.07 mass % or less Si and 0.07 mass % or less Fe.

11. The aluminum alloy welded component according to claim 1, wherein the aluminum alloy welded component is a vehicular wheel comprising a single cylindrical-shaped aluminum alloy member integrally welded having a friction stir weld along its mutually-facing end surfaces.

12. The aluminum alloy welded component according to claim 1, wherein the aluminum alloy welded component is a housing comprising two aluminum alloy members having a friction stir weld along their mutually-facing end surfaces.

13. A method for manufacturing an aluminum alloy welded component, including:
   abutting mutually-facing end surfaces of one or more aluminum alloy members comprised of 0.3-6.0 mass % Mg, 0.2 mass % or less Cu, 0.1 mass % or less Si, 0.1 mass % or less Fe, the balance being Al and inevitable impurities, wherein all second phase particles dispersed within the aluminum alloy member(s) have a grain size of 5 μm or less as observed with an optical microscope, friction stir welding along the abutted mutually-facing end surfaces to integrally weld them together and form a welded section; and anodizing an outer surface of the welded section, or an opposite surface thereof, to form an anodized coating thereon.

14. The method according to claim 13, wherein the anodizing step is performed with sulfuric acid.

15. The method according to claim 14, wherein the anodized step is performed until the anodized coating has a thickness of 10 μm.

16. The method according to claim 13, wherein the anodized step is performed until the anodized coating has a thickness of 10 μm.

17. An aluminum alloy welded component produced by the method of claim 13.

18. An aluminum alloy welded component including:

one or more aluminum alloy members comprised of Mg: 0.3 mass % to 6.0 mass %, Cu: 0.2 mass % or less, Si: 0.1 mass % or less, Fe: 0.1 mass % or less, the balance being Al and inevitable impurities, wherein:

second phase particles dispersed within the aluminum alloy member(s) have a grain size of 5 μm or less as observed with an optical microscope;

mutually-facing end surfaces of the aluminum alloy member(s) are integrally welded by friction stir welding so as to form a welded section; and a coating is formed by anodizing an outer surface of the welded section, or on an opposite surface thereof.

19. The aluminum alloy welded component according to claim 18, wherein the second phase particles are dispersed in the aluminum alloy members in an amount of 10000 particles/mm$^2$ or less as observed with an optical microscope.

20. The aluminum alloy welded component according to claim 19, wherein the aluminum alloy member(s) contain(s) 2.0-6.0 mass % Mg, 0.07 mass % or less Si and 0.07 mass % or less Fe.

* * * * *